US00RE38418E

(19) United States
(12) Reissued Patent
Deken et al.

(10) Patent Number: US RE38,418 E
(45) Date of Reissued Patent: Feb. 10, 2004

(54) DUAL MEMBER PIPE JOINT FOR A DUAL MEMBER DRILL STRING

(75) Inventors: Arthur D. Deken, Perry, OK (US); Cody L. Sewell, Perry, OK (US)

(73) Assignee: The Charles Machine Works, Inc., Perry, OK (US)

(21) Appl. No.: 09/434,226

(22) Filed: Nov. 4, 1999

Related U.S. Patent Documents

Reissue of:
(64) Patent No.: 5,682,956
Issued: Nov. 4, 1997
Appl. No.: 08/601,635
Filed: Feb. 14, 1996

(51) Int. Cl.[7] ..... E21B 4/06
(52) U.S. Cl. ..... 175/19; 464/153; 175/61
(58) Field of Search ..... 175/19, 320, 61; 464/147, 149, 153, 154, 157, 158, 182; 403/359

(56) References Cited

U.S. PATENT DOCUMENTS

| | | | | |
|---|---|---|---|---|
| 2,819,039 A | | 1/1958 | Lindsay et al. | 255/1.6 |
| 3,065,807 A | | 11/1962 | Wells | 175/321 |
| 3,638,970 A | | 2/1972 | Sandquist et al. | 285/24 |
| 3,998,479 A | | 12/1976 | Bishop | 285/133 |
| 4,012,061 A | | 3/1977 | Olson | 285/133 |
| 4,501,336 A | | 2/1985 | Kemp et al. | 175/61 |
| 4,834,193 A | | 5/1989 | Leitko, Jr. et al. | 175/19 |
| 4,850,440 A | | 7/1989 | Smet | 175/67 |
| 5,101,918 A | | 4/1992 | Smet | 175/424 |
| 5,163,520 A | * | 11/1992 | Gibson et al. | 175/19 |
| 5,361,855 A | | 11/1994 | Schuermann et al. | 175/67 |
| 5,423,388 A | | 6/1995 | Hale | 175/74 |
| 5,467,831 A | | 11/1995 | Spektor | 175/19 |
| 5,490,569 A | | 2/1996 | Brotherton et al. | 175/61 |
| 5,713,423 A | * | 2/1998 | Martin et al. | 175/62 |

FOREIGN PATENT DOCUMENTS

| | | | |
|---|---|---|---|
| JP | 260192 | 10/1989 | E21B/7/08 |

* cited by examiner

*Primary Examiner*—William Neuder
(74) *Attorney, Agent, or Firm*—McKinney & Stringer, P.C.

(57) ABSTRACT

A dual-member pipe joint having an outer member and an inner member which is disposed coaxially within the outer member. Both the outer member and the inner member have a pin end and a box end. The pin end of the outer member is threadable to the box end of another outer member. The pin end of the inner member is geometrically shaped. The box end of the inner member forms a recess which conforms to the geometric shape of the pin end of the inner member. The box end of the inner member nonthreadably receives the pin end of another inner member in "slip-fit" connection. "Slip-fit" means the pin end of the inner member slides into the box end of a like inner member and forms a connection that is capable of transmitting torque. The advantage of this dual-member pipe joint is that both the inner and outer members of a pipe joint may be connected to a drill string in a single action with just one connection. This dual-member pipe joint reduces boring time as compared to boring with conventional dual-member pipe joints, in which both the inner and outer members are threadably connected and thus require two pipe connections. The dual-member pipe joint is usable as a system of pipe, and as part of a boring machine.

65 Claims, 4 Drawing Sheets

DUAL MEMBER PIPE JOINT FOR A DUAL MEMBER DRILL STRING

Matter enclosed in heavy brackets [ ] appears in the original patent but forms no part of this reissue specification; matter printed in italics indicates the additions made by reissue.

FIELD OF THE INVENTION

The present invention relates generally to pipe joints, and in particular to dual-member pipe joints, systems of dual-member pipe joints comprising dual member drill strings, boring machines using dual-member pipe joints and to methods of boring horizontal boreholes using dual-member pipe joints.

SUMMARY OF THE INVENTION

The present invention is directed to a pipe joint. The pipe joint comprises an elongate, hollow outer member having an inner surface and an outer surface and a pin end and a box end which are correspondingly threaded. An elongate inner member is arranged general coaxially within the outer member forming an annular space between the inner member and the inner surface of the outer member. The inner member has a geometrically-shaped pin end and a box end corresponding to the shape of the pin end of the inner member. The pin end of the inner member is slidably receivable in connector-free, torque-transmitting engagement with the box end of a similarly formed inner member.

The present invention further includes a system of pipe joints comprising a plurality of pipe joints as hereinabove described. The pin end of the inner member of each pipe joint is connectable to the box end of the inner member of another one of the plurality of pipe joints. The pin end of the outer member of each pipe joint is connectable to the box end of the outer member of another one of the plurality of pipe joints. When connected, the outer members of the plurality of pipe joints form a passageway extending the length of the system of pipe joints.

The present invention further comprises a horizontal boring machine comprising a frame, a rotary machine supported on the frame, a drill string and a directional boring head. The drill string has a first end, which is operatively connectable to the rotary machine to drive the rotation of the drill string, and a second end, which is attachable to the directional boring head. The drill string is comprised of a system of pipe joints as hereinabove described.

Still further, the present invention includes a horizontal boring machine as hereinabove described wherein the rotary machine further comprises a carriage supported on the frame, an inner member drive group, an outer member drive group and a biasing assembly. The inner member drive group is supported on the carriage assembly and drives the rotation of the inner members comprising the drill string. The inner member drive group comprises an inner member drive motor, an inner spindle and a torque-transmitting member for transmitting torque from the inner member drive motor to the inner spindle. The inner spindle is connectable to the inner member of a pipe joint loaded on the boring machine for connection to the drill string or to the inner member at the first end of the drill string.

The outer member drive group is supported on the carriage assembly and drives the plurality of outer members comprising the drill string. The outer member drive group comprises a motor, an outer spindle and a torque-transmitting member for transmitting torque from the outer member drive motor to the outer spindle. The outer spindle is connectable to the outer member of a pipe joint loaded on the boring machine for connection to the drill string or to the outer member at the first end of the drill string.

The biasing assembly is supported on the carriage and is adapted to urge substantially simultaneous, slideable, connector-free, torque-transmitting engagement of the inner member of a pipe joint loaded on the boring machine for connection with the rotary machine and with the inner member at the first end of the drill string.

Still further, the present invention includes a horizontal boring machine comprising a plurality of pipe joints as hereinabove described.

Finally, the present invention includes a method for making directional boreholes using a boring machine having a rotary machine capable of simultaneously rotating and axially advancing a directional boring head attached to a drill string comprised of a plurality of connectable pipe joints constructed in accordance with the present invention. The method comprises the steps of; first, making one connection per additional pipe joint loaded on the boring machine for connection with the drill string by simultaneously axially advancing the rotary machine and transmitting torque from the rotary machine to the additional pipe joint, whereby the outer member of the new pipe joint substantially simultaneously connects with the rotary machine and with the outer member at the first end of the drill string while the inner member of the additional pipe joint substantially simultaneously connects in slideable, connector-free, torque-transmitting engagement with the rotary machine and with the inner member at the first end of the drill string, and, second, axially advancing and rotating the directional boring head to make a borehole.

BRIEF DESCRIPTION OF THE DRAWINGS

*FIG. 6 shows a side view in cross-section of a directional boring head with a deflection shoe.*

DETAILED DESCRIPTION OF THE PREFERRED EMBODIMENTS

Figure 1:
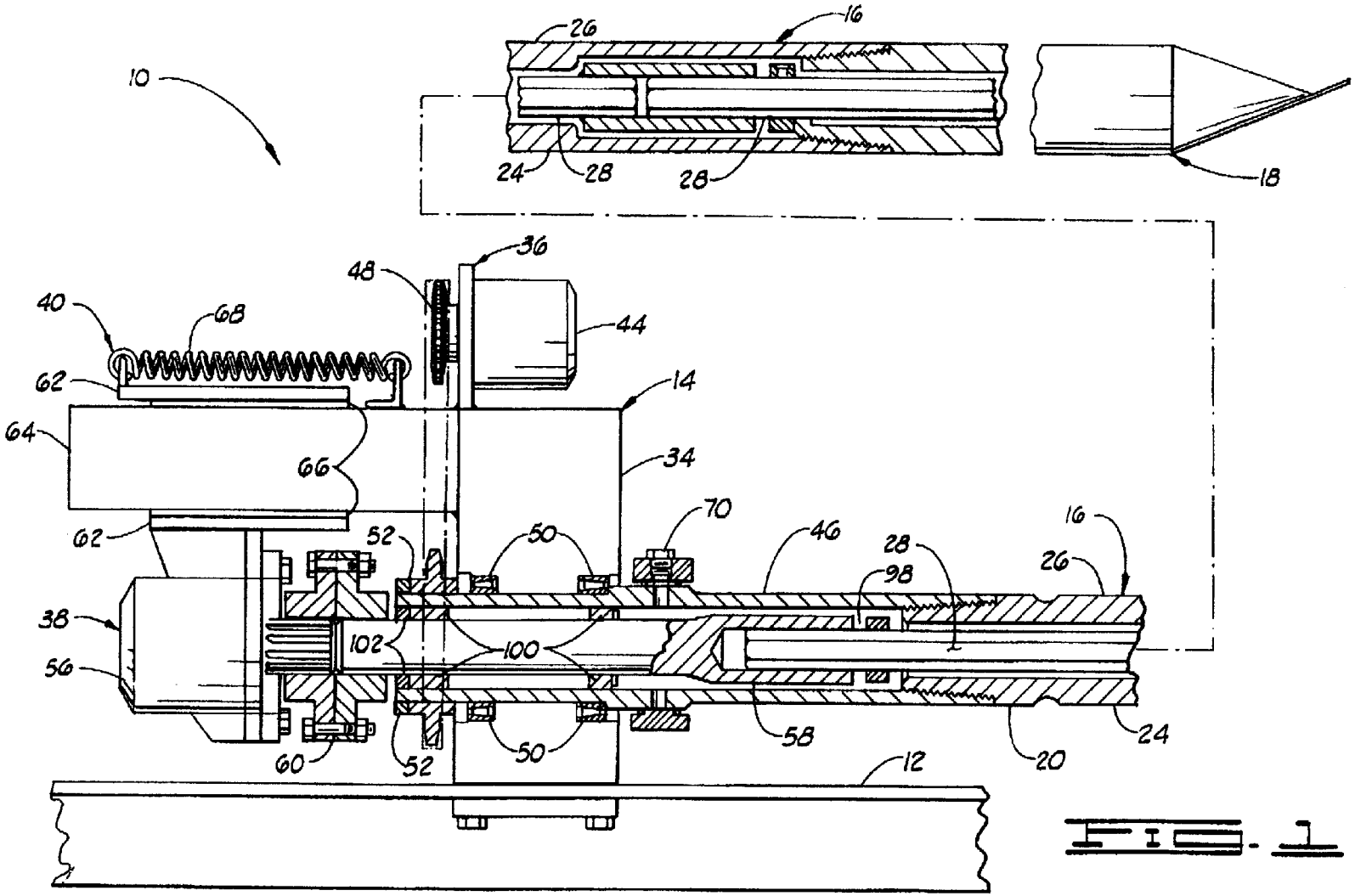
FIG. 1 shows a side elevational, partly cross-sectional view of the boring machine of the present invention.

Horizontal boring machines have now almost totally supplanted trenching techniques for laying underground utility lines and other conduits. Various system are available for directional or steerable drilling. For example, when drilling in soil, a machine with a single drill rod with a slant face bit is ideal. Drilling of the bore hole occurs while the drill rod is rotated. Steering occurs when the slant face bit is advanced without rotating the drill rod; the slanted face simply pierces the soil causing the drill bit to be deflected thus altering the angle of the axis.

However, this technology is not effective in rocky conditions because the slanted face bit cannot be advanced through rock. Thus, for rock drilling applications, dual-member drill string systems are preferred. Dual-member drill strings are comprised of a plurality of pipe joints, each of which comprises an inner member supported inside an outer pipe or member. The inner member of the drill pipe constantly drives rotation of the boring head to excavate the formation, and the outer member of the drill pipe is selectively rotated to align the steering mechanism, *such as a deflection shoe* (*FIGS. 6 and 7*), to change the direction of the borehole while the rotating bit continues to drill. One such system is described in U.S. patent application Ser. No. 08/215,649, filed Mar. 22, 1994, *and issued on Feb. 13, 1996, as U.S. Pat. No. 5,490,569,* entitled Directional Boring Head With Deflection Shoe, the contents of which are incorporated herein by reference.

With conventional drill string systems, the ends of both the inner member and outer members of a dual member drill string are threaded. Thus, making up and breaking out pipe joints in a dual member drill string system is more time consuming requiring two pipe connections instead of one for each joint. When adding a conventional dual-member pipe joint to the drill string, a connection is first made with the inner member of the pipe joint and then the outer member. The spindle of the boring machine is threaded to the first end of the inner member of a new pipe joint to be added to the drill string. The inner member of the new joint of pipe is then threaded to the inner member at the end of the drill string. Then, the spindle must be withdrawn from the inner member before threading the outer member to prevent the outer member from receiving torque. The outer member is then threaded to the drill string in the same manner. After both the inner and outer members have been threaded to the drill string, boring may continue. Consequently, while conventional dual-member pipe joints are effective, they are inefficient because so much time is spent assembling and disassembling pipe joints.

The present invention greatly reduces the time required to make and break pipe joint connections. The present invention provides a dual-member "slip fit" connection at each end of the inner member and a threaded connection at each end of the outer pipe member. The inner member may be either a tubular section of a solid rod. This permits both the inner and outer members to be connected to a like pipe joint in a single step, instead of threadably connecting first the inner and then the outer members in a series of steps. This single-action connection is achieved by forming the ends of the inner members in a non-threaded, geometric shape which permits axial sliding connection of a like joint to form a connector-free, torque-transmitting slip-fit connection, while threadably connecting the outer members of the joints. This single-action slip-fit connection substantially reduces the amount of time required to make and break pipe joint connections and similarly reduces the operating costs associated with a particular boring operation. These and other advantages of the present invention will be apparent from the following description of the preferred embodiments.

Turning now to the drawings in general and to FIG. 1 in particular, there is shown therein a horizontal boring machine 10 constructed in accordance with the present invention. The horizontal boring machine 10 comprises a frame 12, a rotary machine 14, also called a rotary tool head, supported on the frame, a drill string 16 and a directional boring head 18.

The directional boring head 18 may be any boring head suitable for the boring conditions, whether hard or soft soil or rock. The boring head described in U.S. patent application Ser. No. 08/215,649 is particularly adapted to bore through hard rock conditions and is suitable for use with the horizontal boring machine 10 of the present invention.

The drill string 16 has a first end 20 and a second end 22. The first end 20 of the drill string 16 is operatively connectable to the rotary machine 14 to drive the rotation of the drill string. The second end 22 of the drill string 16 is operatively connectable to the directional boring head 18. The drill string 16 is comprised of a plurality of connectable dual-member pipe joints 24. As used herein, a "pipe joint" means one of a plurality of sections of drill pipe and/or drill rod which together form the drill string 16. Each pipe joint 24 has an outer member 26 and an inner member 28, each of which will be more fully described herein.

In the preferred practice of the present invention, the rotary machine 14 comprises two independent drive members for independently driving the plurality of outer members 26 and inner members 28 comprising the drill string 16. The rotary machine thus preferably comprises a carriage 34 supported on the frame 12, an outer member drive group 36 for driving the plurality of outer members 26, an inner member drive group 38, also called the inner member drive shaft group, for driving the plurality of inner members 28 and a biasing assembly 40 for urging engagement of the inner members.

With continuing reference to FIG. 1, the outer member drive group 36 is supported on the carriage 34 and comprises an outer member drive motor 44, an outer spindle 46 and a torque-transmitting member 48. The outer member drive motor 44 transmits torque to the outer spindle 46 through the torque-transmitting member 48. It will be appreciated that any means for transmitting torque from the outer member drive motor 44 to the outer spindle 46 may be used. A sprocket and chain assembly having upper and lower sprockets is shown in FIG. 1 for this purpose. The outer spindle 46 is threadably connectable to the outer member 26 at the first end 20 of the drill string 16. The outer spindle 46 transmits torque to the plurality of outer members 26 comprising the drill string 16. The outer spindle 46 is supported on the carriage by a pair of tapered roller bearings 50 which are held in place by the retainer 52.

Referring still to FIG. 1, the inner member drive group 38 is supported on the carriage 34 and comprises an inner member drive motor 56, an inner spindle 58, also called a drive shaft spindle, and a torque-transmitting member 60. The inner member drive motor 56 may be supported on the carriage 34 with a sliding mounting bracket 62 mounted on a slide member 64 with a square slide bushing 66. The inner member drive motor 56 transmits torque to the inner spindle 58 through the torque-transmitting member 60. FIG. 1 shows a splined coupling assembly coupling the inner member drive motor 56 with the inner spindle 58. It will be appreciated that any means capable of transmitting torque from the inner member drive motor 56 to the inner spindle 58 will suffice. The inner spindle 58 is connectable to the inner member 28 at the first end 20 of the drill string 16 in a manner yet to be described. The plurality of inner members 28 comprising the drill string 16 transmit torque from the inner spindle 58 to the directional boring head 18 at the second end 22 of the drill string.

The biasing assembly 40 is supported on the carriage 34 and is adapted to urge connection of the inner member 28 with the inner spindle 58 and with the inner member at the first end 20 of the drill string 16. In the preferred embodiment, a set of extension springs 68 supported on the sliding mounting bracket 62 and the slide bushing 66 comprise the biasing assembly 40.

With continuing reference to FIG. 1, a fluid swivel 70 formed in the outer spindle 46 receives boring fluids from a fluid source not shown. Boring fluids are transported to the directional boring head 18 in a manner yet to be described. The boring fluids lubricate and cool the directional boring head 18, transport cuttings from the borehole, and help stabilize the borehole by preventing collapse of the soil around the borehole.

Figure 2:
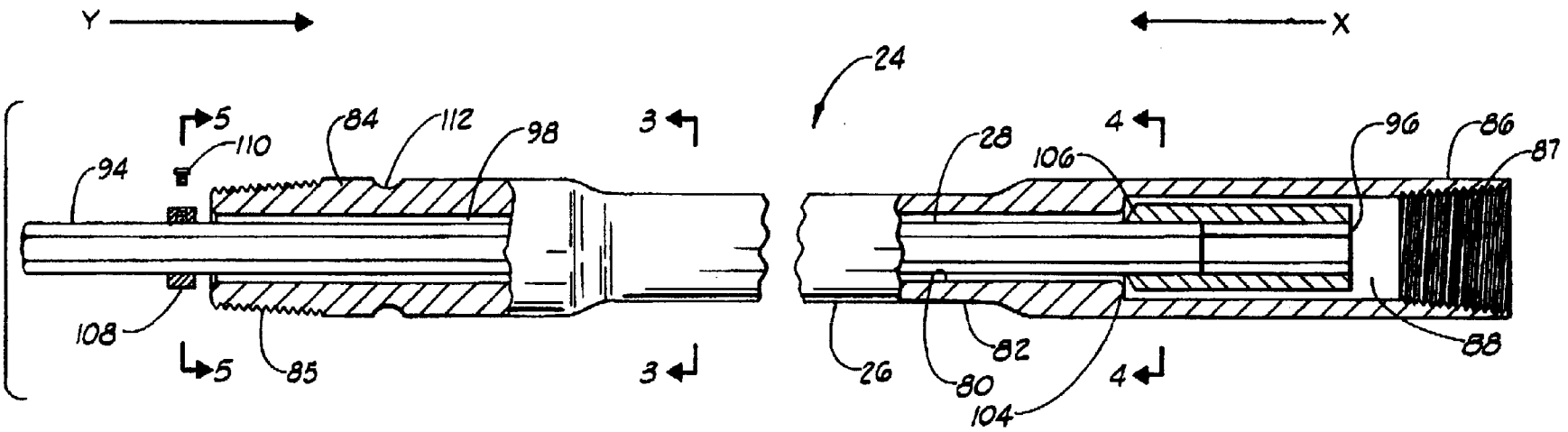
FIG. 2 shows an exploded, side elevational, partly cross-sectional view of the pipejoint in accordance with the present invention.

Turning now to FIG. 2, the preferred pipe joint for use with the boring machine 10 is illustrated. FIG. 2 shows a dual-member pipe joint constructed in accordance with the present invention and designated generally by the reference numeral 24. The pipe joint comprises an elongate, tubular outer member 26 and an elongate inner member 28, also called a drive shaft member. Each member is independently capable of transmitting torque for use downhole during the boring operation.

The outer member 26 is preferably tubular having an inner surface 80 and an outer surface 82. The outer member 26 comprises a pin end 84 and a box end 86. The pin end 84 and the box end 86 are correspondingly threaded. That is, the pin end 84 is provided with tapered external threads 85, and the box end 86 is provided with tapered internal threads 87. Thus, the box end 86 of the outer member 26 is connectable to the pin end 84 of a like pipe joint 24. Similarly, the pin end 84 of the outer member 26 is connectable to the box end 86 of a like pipe joint.

The external diameters of the pin end 84 and the box end 86 of the outer member 26 may be larger than the external diameter of the central body portion of the outer member. The box end 86 of the outer member 26 forms an enlarged internal space 88 for a purpose yet to be described.

With continuing reference to FIG. 2, the inner member 28 is elongate. The external diameter of the inner member 28 is smaller than the smallest internal diameter of the outer member 26. In the preferred embodiment, the inner member 28 is integrally formed and comprises a solid rod. However, it will be appreciated that in some instances a tubular inner member 28 may be satisfactory. The box end 96 of the inner member 28 may be brazed, forged or welded or attached to the inner member by any suitable means.

As previously discussed, one advantage of the present invention is found in the single-action, slip-fit connection between the inner members 28 of like pipe joints 24. To that end, the inner member 28 is provided with a geometrically-shaped pin end 94 and with a box end 96 forming a geometrically-shaped recess corresponding to the shape of the pin end of the inner member. As used herein, "geometrically-shaped" denotes any configuration which permits the pin end 94 to be slidably received in the box end 96, but which prevents rotation of the pin end relative to the box end when thus connected. This provides a single action, connector-free engagement which is capable of transmitting torque from one joint to the next throughout the length of the drill string 16 to the directional boring head 18. As used herein, "connector-free" means the absence of any latch or other attaching device required to retain the pin end 94 of the inner member 28 inside the box end 96 of a like inner member.

A preferred geometric shape for the pin end 94 and box end 96 of the inner member 28 is the hexagon. Any geometric configuration which permits single action, connector-free, slip-fit connection between inner members 28 will suffice. However, it will be understood that for purposes of this application, "geometrically shaped" does not include a perfectly circular shape as this would not allow torque transmission from one joint to the next.

Figure 3:
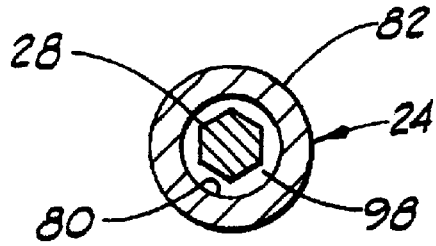
FIG. 3 shows a cross-sectional view of the pipe joint of the present invention taken along line 3—3 of FIG. 1.

As illustrated in FIGS. 2 and 3, the inner member 28 is arranged generally coaxially inside the outer member 26. The arrangement of the inner member 28 within the outer member 26 creates an annular space 98 between the inner member and the inner surface 80 of the outer member. FIG. 3 shows in cross-section along line 3—3 of FIG. 1 the arrangement of the inner member 28 within the outer member 26 and the annular space 98 created therebetween.

A string of connected inner members 28 and outer members 26 thus creates a passageway extending the length of the drill string 16. It will now be appreciated that boring fluids can enter the drill string 16 through the fluid swivel 70, as shown in FIG. 1, and travel the length of the drill string 16 through the annular space 98 between connected inner members 28 and outer members 26 to the directional boring head 18. Packing 100, illustrated in FIG. 1 and held in place by retainer 102, prevents release of boring fluids from the annular space 98 and prevents contaminants from entering the annular space.

Alternatively, in those instances when the inner member 28 is tubular, fluids may travel to the directional boring head 18 through a passageway formed by a connected string of tubular inner members. Thus, a tubular inner member 28 may be utilized when it is desirable to transport more than one type of drilling fluid. A tubular inner member 28 may also be utilized when it is desirable to transport drilling fluids through the passageway formed by connected tubular inner members rather than through the annular space 98 formed between the connected inner members 28 and outer members 26. The location of the packing 100 will be adjusted depending upon the passageway through which boring fluids travel.

Figure 4:
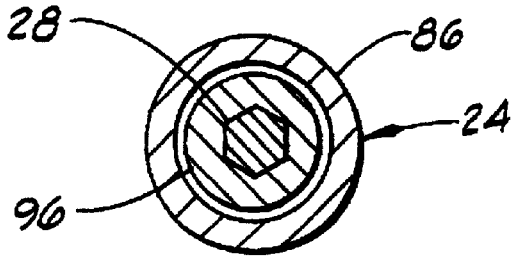
FIG. 4 shows a cross-sectional view of the pipe joint of the present invention taken along line 4—4 of FIG. 1.

Returning to FIG. 2, the box end 96 of the inner member 28 is disposed within the box end 86 of the outer member 26. It will now be appreciated why the box end 86 of the outer member 26 forms an enlarged internal space 88 for housing the box end 96 of the inner member 28. This arrangement facilitates the single-action connection of the pipe joint 24 with the drill string 16 and the rotary machine 14. FIG. 4 shows in cross-section the disposition of the box end 96 of the inner member 28 within the box end 86 of the outer member 26.

It is desirable to construct the dual-member pipe joint 24 so that the inner member 28 is slidably insertable in and removable from the outer member. This allows easy repair and, if necessary, replacement of the inner member. Yet, in the assembled pipe joint, longitudinal movement of the inner member 28 within the outer member 26 must be restricted. Accordingly, stop devices are provided in the pipe joint 24.

Referring again to FIG. 2, to limit movement in direction X, the inner surface 80 of the outer member 26 forms an annular shoulder 104 at the box end 86. In addition, the box end 96 of the inner member 28 forms a shoulder 106 which is larger than the annular shoulder 104. Thus, when the inner member 28 is moved in direction X, the shoulder 106 abuts annular shoulder 104 preventing further movement in that direction.

Figure 5:
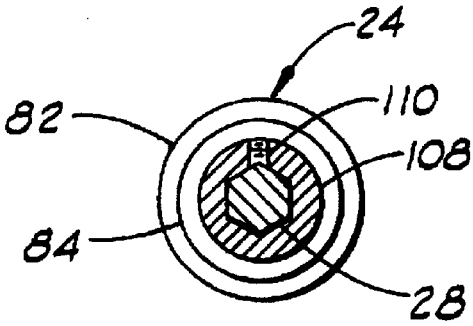
FIG. 5 shows a cross-sectional view of the pipe joint of the present invention taken along line 5—5 of FIG. 1.

Longitudinal movement of the inner member in the direction of the box ends 84 and 94, designated as direction Y in FIG. 2, is restricted by providing a radially projecting annular stop member. The pin end 94 of the inner member 28 extends a distance beyond the pin end 84 of the outer member 26. A radially projecting annular stop member is disposed near the pin end 94 of the inner member 28 beyond the pin end 84 of the outer member 26. As shown in exploded view in FIG. 2, the radially projecting annular stop member preferably comprises a collar 108 and a set screw or pin 110. The interaction of the collar 108 and set screw 110 with the inner member 28 is shown in cross-section in FIG. 5. When the inner member 28 is moved in direction Y, the stop collar 108 abuts the pin end 84 of the outer member 26 and obstructs further movement.

It is desirable for the outer surface 82 of the outer member 26 to define a circumferential groove 112 near the pin end 84 of the outer member, as shown in FIG. 2. The circumferential groove 112 facilitates positioning of the pipe joint 24 in proper location on the boring machine 10 for make-up and break-out of pipe joints to or from the drill string 16.

Figures 3, 7:
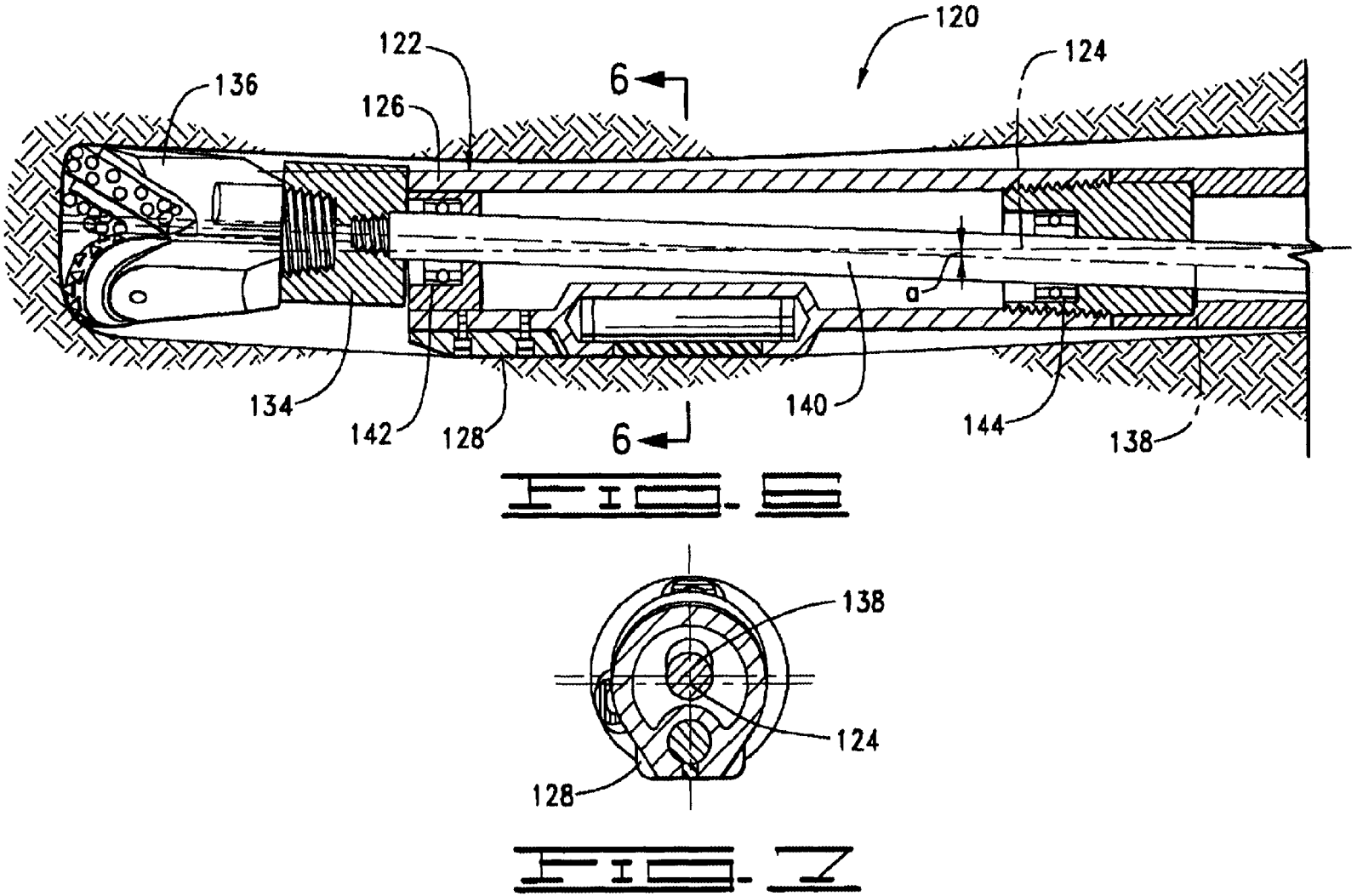
*FIG. 7 shows a cross-sectional view taken along lines 6—6 in FIG. 6.*

*With reference now to FIGS. 6 and 7, a preferred embodiment of the present invention is illustrated and formed by directional boring head 120. The directional boring head 120 is used to bore a borehole through the ground with directional control of the borehole.*

*Preferably, the directional boring head 120 includes a body 122 having an elongate axis 124, a steering mechanism (yet to be described), and a front end 126. As shown in FIG. 6, the steering mechanism comprises a deflection shoe 128 mounted near the front end 126 of the body 122. At the front end 126 of the body 122 is a drill bit base 134. A drill bit 136 is received in the drill bit base 134 for rotary motion about a drill bit axis 138. The drill bit 136 forms the most forward extending portion of the directional boring head 120.*

*As shown in FIGS. 6 and 7, the drill bit axis 138 can be at an angle relative to the elongate axis 124 of the body 122. To accommodate the drill bit 134 being at an angle relative to the elongate axis 124 of the body 122, a drill bit rotating shaft 140 comprising a front end 142 and a back end 144, may be mounted for rotation within the body 122 either at an angle or as a flexible shaft. Alternatively, the drill bit axis 138 can be parallel to the elongate axis 124 of the body 122 and offset therefrom.*

*The body 122 of the directional boring head 120 (also labeled as 18 in FIG. 1) is attached to the end of a drill string (16 in FIG. 1 and such as outer member 26 in FIG. 2) which extends back to the entry point for the borehole.*

*In boring, the rearward end of the drill bit rotating shaft 140 is connected to drill pipe or rod (such as inner member 28 of FIG. 2) extending to the surface. At the surface, a rotary mechanism rotates the drill pipe or rod (inner member 28 of FIG. 2) thereby rotating the drill bit rotating shaft 140 and the drill bit 136. As the directional boring head 120 is pushed forward, the drill bit 136 will cut into the exposed face of the borehole, boring further into the ground. Without rotation of the body 122 about its centerline 124, the presence of the deflection shoe 128, and the angle of offset, α (as shown in FIG. 6), of the drill bit rotational axis away from the longitudinal axis of the body, will cause the directional boring head 120 to deflect from a linear path in a direction opposite the position of the deflection shoe 128.*

*However, the body 122 can be rotated about its centerline axis 124 to either change the direction of motion of the directional boring head 120 or to allow the directional boring head to move forward in a straight line. To move forward in a straight line, the outer members 26 of the drill string and, hence, the body 122 will preferably be rotated at a constant angular velocity, usually significantly less than the angular velocity of the drill bit 136 cutting the bore. To simply deflect the directional boring head 120 in a different direction, the body need only be rotated a certain number of degrees about the centerline axis 124 to position the deflection shoe 128 opposite the direction in which the directional boring head is to be moved. The deflection shoe and the offset angle of the bit, α, will thereafter move the directional boring head in the desired direction as the directional boring head is moved further forward within the bore.*

The present invention also comprises a method for drilling horizontal boreholes using the "slip fit" pipe joints previously described. In accordance with the method of the present invention, a boring site first is selected and a suitable boring machine is assembled. The length and diameter of the desired borehole as well as the conditions of the terrain are considered in selecting the size and type of boring head, the length and diameter of pipe joints and the size of the machine.

Having selected the site and assembled a suitable machine, the boring operation is commenced in a known manner. As the bore hole increases in length, additional pipe joints are added. First, the uppermost pipe joint 24 comprising the drill string 16 is disconnected from the rotary machine 14. An additional pipe joint 24 to be added to the drill string 16 is loaded on the boring machine 10. The circumferential groove 112 of the additional pipe joint 24 rests in a cradle (not illustrated in FIG. 1) to aid proper positioning of the pipe joint on the boring machine 10 for contact with the rotary machine 14.

The rotary machine 14 is then axially advanced along the frame 52. The inner spindle 58 and the outer spindle 46 are rotated as the rotary machine 14 is advanced. The rotating outer spindle 46 contacts the pin end 84 of the outer member 26 of the additional pipe joint 24. Substantially simultaneously, the rotating inner spindle 58 contacts the pin end 94 of the inner member 28 of the additional pipe joint 24. It will now be appreciated that the inner spindle 58 forms a geometrically-shaped recess corresponding to the geometric shape of the pin end 94 of the inner member 28 of the additional pipe joint 24.

The rotating outer spindle 46 threads the pin end 84 of the outer member 26 of the additional pipe joint 24 while, in a single action, the box end 86 of the outer member of the additional pipe joint threads the pin end of the outer member at the first end 20 of the drill string 16. As the outer member 26 is threaded, the rotary machine 14 pushes the inner member 28 of the additional pipe joint 24 in the opposite direction of axial advancement of the rotary machine. The biasing assembly 40 absorbs compression created between the carriage 34 and the inner member 28 of the additional pipe joint 24 as the rotary machine 14 advances. The sides of the geometrically-shaped recess of the rotating inner spindle 58 align with the sides of the correspondingly shaped pin end 94 of the inner member 28 of the additional pipe joint 24 as the biasing assembly 40 urges the pin end of the additional pipe joint to slip-fit with the rotating inner spindle.

Substantially simultaneously with the engagement of the pin end 94 of the inner member 28 of the additional pipe joint 24 with the inner spindle 58, the box end 96 of the inner member of the additional pipe joint receives in slip-fit engagement the pin end of the inner member at the first end 20 of the drill string 16. Thus, an additional pipe joint 24 is added to the drill string 16 in a single action by making only one connection. After the connection is made, the rotary machine 14 continues axially advancing and rotating the drill string 16 to bore a hole in the ground, and additional pipe joints 24 are added as needed.

The method is reversed to withdraw the pipe joints 24 from the borehole.

Now it will be appreciated that the present invention provides an improved dual-member pipe joint for horizontal boring operations. The inner members of these pipe joints are connected simultaneously with the threading operation which connects the outer members of adjacent pipe joints. The geometrically shaped pin and box ends permit a simple, slip fit, connector-free engagement which effectively transmits torque. This, in turn, substantially reduces the time required in the boring operation for making up and breaking the pipe joints.

Changes may be made in the combination and arrangements of the various parts, elements, steps and procedures described herein without departing from the spirit and scope of the invention as defined in the following claims.

We claim:

1. A pipe joint for use in drill strings in rotary boring applications comprising:

an elongate, hollow outer member having an inner surface and an outer surface and having a pin end and a box end, wherein the pin end and the box end are correspondingly threaded; and an elongate inner member having a geometrically-shaped pin end and a box end forming a geometrically-shaped recess corresponding to the shape of the pin end of the inner member, the pin end being slideably receivable in connector-free, torque-transmitting engagement with the box end of a similarly formed inner member;

wherein the inner member is arranged generally coaxially within the outer member forming an annular space between the inner member and the inner surface of the outer member.

2. The pipe of claim 1 wherein the box end of the inner member is positioned within the box end of the outer member and the inner surface of the outer member forms an annular shoulder at the box end of the outer member and the box end of the inner member forms a shoulder, the shoulder of the inner member being sized to restrict axial movement of the inner member within the outer member in the direction of the pin ends of the inner and outer members.

3. The pipe of claim 2 wherein the pin end of the inner member extends a distance beyond the pin end of the outer member and a radially projecting annular stop member is disposed near the pin end of the inner member beyond the pin end of the outer member.

4. The pipe of claim 3 wherein the radially projecting annular stop member comprises a collar and a set screw.

5. The pipe of claim 1 wherein the outer surface of the outer member defines a circumferential groove near the pin end of the outer member.

6. The pipe of claim 1 wherein the inner member comprises a solid rod.

7. A system of pipe joints comprising:

a plurality of pipe joints, each pipe joint comprising:

an elongate, hollow outer member having an inner surface and an outer surface and having a pin end and a box end, wherein the pin end and the box end are correspondingly threaded; and an elongate inner member having a geometrically-shaped pin end and a box end forming a geometrically-shaped recess corresponding to the shape of the pin end of the inner member, the pin end being slideably receivable in connector-free, torque-transmitting engagement with the box end of a similarly formed inner member;

wherein the inner member is arranged generally coaxially within the outer member forming an annular space between the inner member and the inner surface of the outer member;

wherein the pin end of the inner member of each pipe joint is connectable to the box end of the inner member of another one of the plurality of pipe joints; and wherein the pin end of the outer member of each pipe joint is connectable to the box end of the outer member of another one of the plurality of pipe joints so that the outer members of the plurality of pipe joints, when connected, form a passageway extending the length of the system of pipe joints.

8. The system of pipe joints of claim 7 wherein the box end of the inner member is positioned within the box end of the outer member, the inner surface of the outer member forms an annular shoulder at the box end of the outer member and the box end of the inner member forms a shoulder, the shoulder of the inner member being sized to restrict axial movement of the inner member within the outer member in the direction of the pin ends of the inner and outer members.

9. The system of pipe joints of claim 8 wherein the pin end of the inner member extends a distance beyond the pin end of the outer member and a radially projecting annular stop member is disposed near the pin end of the inner member beyond the pin end of the outer member.

10. The system of pipe joints of claim 9 wherein the radially projecting annular stop member comprises a collar and a set screw.

11. The system of pipe joints of claim 7 wherein the outer surface of the outer member defines a circumferential groove near the pin end of the outer member.

12. The system of pipe joints of claim 7 wherein the inner member comprises a solid rod.

13. A horizontal boring machine comprising:

a frame;

a rotary machine supported on the frame;

a drill string having a first end and a second end, the first end being operatively connectable to the rotary machine to drive the rotation of the drill string, the drill string comprising:

a plurality of pipe joints, each pipe joint comprising:

an elongate, hollow outer member having an inner surface and an outer surface and having a pin end and a box end, wherein the pin end and the box end are correspondingly threaded; and an elongate inner member having a geometrically-shaped pin end and a box end forming a geometrically-shaped recess corresponding to the shape of the pin end of the inner member, the pin end being slideably receivable in connector-free, torque-transmitting engagement with the box end of a similarly formed inner member;

wherein the inner member is arranged generally coaxially within the outer member forming an annular space between the inner member and the inner surface of the outer member;

wherein the pin end of the inner member of each pipe joint is connectable to the box end of the inner member of another one of the plurality of pipe joints; and wherein the pin end of the outer member of each pipe joint is connectable to the box end of the outer member of another one of the plurality of pipe joints so that the outer members of the plurality of pipe joints, when connected, form a passageway extending the length of the system of pipe joints; and a directional boring head attached to the second end of the drill string.

14. The horizontal boring machine of claim 13 wherein the rotary machine further comprises:

a carriage assembly supported on the frame;

an inner member drive group for driving the plurality of inner members comprising the drill string, the inner member drive group being supported on the carriage assembly and comprising an inner member drive motor, an inner spindle and a torque-transmitting member for transmitting torque from the inner member drive motor to the inner spindle, wherein the inner spindle is connectable to the inner member at the first end of the drill string;

an outer member drive group for driving the plurality of outer members comprising the drill string, the outer member drive group being supported on the carriage assembly and comprising an outer member drive motor, an outer spindle and a torque-transmitting member for transmitting torque from the outer member drive motor to the outer spindle, wherein the outer spindle is connectable to the outer member at the first end of the drill string; and a biasing assembly supported on the carriage and adapted to urge substantially simultaneous, slideable, connector-free, torque-transmitting engagement of the inner member of a pipe joint loaded on the boring machine with the rotary machine and with the inner member at the first end of the drill string.

15. The boring machine of claim 13 wherein the box end of the inner member is positioned within the box end of the outer member, the inner surface of the outer member forms an annular shoulder at the box end of the outer member and the box end of the inner member forms a shoulder, the shoulder of the inner member being sized to restrict axial movement of the inner member within the outer member in the direction of the pin ends of the inner and outer members.

16. The boring machine of claim 15 wherein the pin end of the inner member extends a distance beyond the pin end of the outer member and a radially projecting annular stop member is disposed near the pin end of the inner member beyond the pin end of the outer member.

17. The boring machine of claim 16 wherein the radially projecting annular stop member comprises a collar and a set screw.

18. The boring machine of claim 13 wherein the outer surface of the outer member defines a circumferential groove near the pin end of the outer member.

19. The boring machine of claim 13 wherein the inner member comprises a solid rod.

20. A horizontal boring machine, comprising:

a frame;

a drill string having a first end and a second end, the drill string comprising a plurality of pipe joints, each pipe joint comprising:

an elongate, hollow outer member having an inner surface and an outer surface and having a pin end and a box end, wherein the pin end and the box end are correspondingly threaded; and an elongate inner member having a geometrically-shaped pin end and a box end forming a geometrically-shaped recess corresponding to the shape of the pin end of the inner member, the pin end being slideably receivable in connector-free torque-transmitting engagement with the box end of a similarly formed inner member;

wherein the inner member is arranged generally coaxially within the outer member forming an annular space between the inner member and the inner surface of the outer member;

wherein the pin end of the inner member of each pipe joint is connectable to the box end of the inner member of another one of the plurality of pipe joints; and wherein the pin end of the outer member of each pipe joint is connectable to the box end of the outer member of another one of the plurality of pipe joints so that the outer members of the plurality of pipe joints, when connected, form a passageway extending the length of the system of pipe joints;

a directional boring head attached to the second end of the drill string; and a rotary machine supported on the frame, the rotary machine being operatively connectable to the first end of the drill string for driving the rotation of the drill string, the rotary machine comprising:

a carriage assembly supported on the frame;

an inner member drive group for driving the plurality of inner members comprising the drill string, the inner member drive group being supported on the carriage assembly and comprising an inner member drive motor, an inner spindle and a torque-transmitting member for transmitting torque from the inner member drive motor to the inner spindle, wherein the inner spindle is connectable to the inner member at the first end of the drill string;

an outer member drive group for driving the plurality of outer members comprising the drill string, the outer member drive group being supported on the carriage assembly and comprising an outer member drive motor, an outer spindle and a torque-transmitting member for transmitting torque from the outer member drive motor to the outer spindle, wherein the outer spindle is connectable to the outer member at the first end of the drill string; and a biasing assembly supported on the carriage and adapted to urge substantially simultaneous, slideable, connector-free, torque-transmitting engagement of the inner member of a pipe joint loaded on the boring machine with the rotary machine and with the inner member at the first end of the drill string.

21. The boring machine of claim 20 wherein the box end of the inner member is positioned within the box end of the outer member, the inner surface of the outer member forms an annular shoulder at the box end of the outer member and the box end of the inner member forms a shoulder, the shoulder of the inner member being sized to restrict axial movement of the inner member within the outer member in the direction of the pin ends of the inner and outer members.

22. The boring machine of claim 21 wherein the pin end of the inner member extends a distance beyond the pin end of the outer member and a radially projecting annular stop member is disposed near the pin end of the inner member beyond the pin end of the outer member.

23. The boring machine of claim 22 wherein the radially projecting annular stop member comprises a collar and a set screw.

24. The boring machine of claim 20 wherein the outer surface of the outer member defines a circumferential groove near the pin end of the outer member.

25. The boring machine of claim 20 wherein the inner member comprises a solid rod.

26. A method for making directional boreholes using a boring machine having a rotary machine capable of simultaneously rotating and axially advancing a directional boring head attached to a drill string comprising a plurality of connectable pipe joints, each pipe joint having an inner member disposed generally coaxially within an outer member, each outer member being connectable to another one of the outer members comprising the plurality of pipe joints and each inner member being slideably receivable in connector-free, torque-transmitting engagement with the rotary machine and with another one of the inner members comprising the plurality of pipe joints, the method comprising the steps of:

making one connection per additional pipe joint loaded on the boring machine for connection with the drill string by simultaneously axially advancing the rotary machine and transmitting torque from the rotary machine to the additional pipe joint, whereby the outer member of the additional pipe joint substantially simultaneously connects with the rotary machine and with the outer member at the first end of the drill string while the inner member of the additional pipe joint substantially simultaneously, slideably, nonrotatably connects in connector-free torque-transmitting engagement with the rotary machine and with the inner member at the end of the drill string; and axially advancing and rotating the directional boring head to make a borehole.

27. The method of claim 26 further comprising the step of:

breaking pipe joint connections by reversing the method of making pipe joint connections.

28. A horizontal boring machine, comprising:

a drill string having a first end and a second end, the drill string comprising a plurality of pipe joints, each pipe joint comprising:

an elongate, hollow outer member having an inner surface and an outer surface and having a pin end and a box end, wherein the pin end and the box end are correspondingly threaded; and an elongate inner member having a geometrically-shaped pin end and a box end forming a geometrically-shaped recess corresponding to the shape of the pin end of the inner member, the pin end being slideably receivable in connector-free, torque-transmitting engagement with the box end of a similarly formed inner member;

wherein the inner member is arranged generally coaxially within the outer member forming an annular space between the inner member and the inner surface of the outer member;

wherein the pin end of the inner member of each pipe joint is connectable to the box end of the inner member of another one of the plurality of pipe joints; and wherein the pin end of the outer member of each pipe joint is connectable to the box end of the outer member of another one of the plurality of pipe joints so that the outer members of the plurality of pipe joints, when connected, form a passageway extending the length of the system of pipe joints.

29. The horizontal boring machine of claim 28 wherein the box end of the inner member is positioned within the box end of the outer member, the inner surface of the outer member forms an annular shoulder at the box end of the outer member and the box end of the inner member forms a shoulder, the shoulder of the inner member being sized to restrict axial movement of the inner member within the outer member in the direction of the pin ends of the inner and outer members.

30. The horizontal boring machine of claim 29 wherein the pin end of the inner member extends a distance beyond the pin end of the outer member and a radially projecting annular stop member is disposed near the pin end of the inner member beyond the pin end of the outer member.

31. The horizontal boring machine of claim 30 wherein the radially projecting annular stop member comprises a collar and a set screw.

32. The horizontal boring machine of claim 28 wherein the outer surface of the outer member defines a circumferential groove near the pin end of the outer member.

33. The horizontal boring machine of claim 28 wherein the inner member comprises a solid rod.

34. The horizontal boring machine of claim 29 wherein the inner member comprises a pipe, so that when the inner members comprising the plurality of pipe joints are connected, a second passageway extending the length of the system of pipe joints is formed.

*35. A method for making directional boreholes using a boring machine having a drive system capable of simultaneously rotating and axially advancing a directional boring head comprising a drill bit and attached to a drill string comprising a plurality of connectable pipe joints, each pipe having an inner member disposed generally coaxially within an outer member, the method comprising the steps of:*

*connecting the inner member and the outer member of a pipe joint to the inner member and outer member of a like pipe joint substantially simultaneously;*

*axially advancing the directional boring head; and*

*driving rotation of the drill bit with the inner members of the drill string.*

*36. The method of claim 35, wherein a steering mechanism is supported on the outer member near the boring head, the method further comprising the step of:*

*controlling the direction of the borehole by selectively rotating the outer members of the drill string to position the steering mechanism.*

*37. The method of claim 36 further comprising the step of:*

*changing the borehole direction by orienting the outer drill string member substantially in the desired rotational position for an interval of axial advance.*

*38. The method of claim 35 further comprising the step of:*

*simultaneously rotating and axially advancing a directional boring head attached to a drill string using dual rotary drives.*

*39. A pipe joint for use in drill strings in rotary boring applications comprising:*

*an elongate, hollow outer member having an inner surface and an outer surface, a central body portion and having a first end and a second end, wherein the first end and the second end are each connectable to adjacent similarly formed outer members; and*

*an elongate inner member having a first end and a second end, the first end being receivable in non-threaded, torque-transmitting engagement with the second end of a similarly formed inner member while the first end of the outer member connects substantially simultaneously with the second end of a similarly formed outer member;*

*wherein the inner member is arranged generally coaxially within the outer member forming an annular space between the inner member and the inner surface of the outer member.*

*40. The pipe joint of claim 39 wherein the first end and second end of the outer member are correspondingly threaded for connection to adjacent similarly formed outer members.*

*41. The pipe joint of claim 39 wherein the first end and second end of the outer member are correspondingly a pin end and a box end.*

*42. The pipe joint of claim 39 wherein the first end and second end of the inner member are correspondingly a pin end and a box end.*

*43. The pipe joint of claim 39 wherein the first end of the inner member extends a distance beyond the first end of the outer member and a radially projecting annular stop member is disposed near the first end of the inner member beyond the first end of the outer member.*

*44. The pipe joint of claim 39 wherein the outer surface of the outer member defines a circumferential groove near the first end of the outer member.*

*45. The pipe joint of claim 39 wherein the inner member comprises a solid rod.*

*46. The pipe joint of claim 39 wherein the outer surface of the outer member defines a means for positioning the pipe joint on the boring machine near the first end of the outer member.*

*47. A system of pipe joints comprising:*

*a plurality of pipe joints, each pipe joint comprising:*

*an elongate, tubular outer member having an inner surface and an outer surface, a central body portion, and having a first end and a second end, wherein the first end and the second end are each connectable to adjacent similarly formed outer members; and*

*an elongate inner member having a first end and a second end, the first end being receivable in non-threaded, torque-transmitting engagement with the second end of a similarly formed inner member;*

*wherein the inner member is arranged generally coaxially within the outer member forming an annular space between the inner member and the inner surface of the outer member;*

*wherein the first end of the inner member and the first end of the outuer member of each pipe joint are substantially simultaneously connectable to the second end of the inner member and the second end of the outer member of another one of the plurality of pipe joints; and*

*wherein the first end of the outer member of each pipe joint is connectable to the second end of the outer member of another one of the plurality of pipe joints so that the outer members of the plurality of pipe joints, when connected, form a passageway extending the length of the system of pipe joints.*

*48. The system of pipe joints of claim 47 wherein the first end and second end of the outer member are correspondingly threaded for connection to adjacent similarly formed outer member.*

*49. The system of pipe joints of claim 47 wherein the first end and second end of the outer member are correspondingly a pin end and a box end.*

*50. The system of pipe joints of claim 47 wherein the first end and second end of the inner member are correspondingly a pin end and a box end.*

*51. The system of pipe joints of claim 47 wherein the first end of the inner member extends a distance beyond the first end of the outer member and a radially projecting annular stop member is disposed near the first end of the inner member beyond the first end of the outer member.*

*52. The system of pipe joints of claim 47 wherein the outer surface of the outer member defines a circumferential groove near the first end of the outer member.*

*53. The system of pipe joints of claim 47 wherein the inner member comprises a solid rod.*

*54. The system of pipe joints of claim 47 wherein the outer surface of the outer member defines a means for positioning the pipe joint on the boring machine near the first end of the outer member.*

*55. A horizontal boring machine, comprising:*

*a drill string having a first end and a second end, the drill string comprising a plurality of pipe joints, each pipe joint comprising:*

*an elongate, tubular outer member having an inner surface and an outer surface and having a first end and a second end, wherein the first end and the second end are each connectable to similarly formed outer members; and*

*an elongate inner member having a first end and a second end, the first end being receivable in non-threaded, torque-transmitting engagement with the second end of a similarly formed inner member;*

*wherein the inner member is arranged generally coaxially within the outer member forming an annular space between the inner member and the inner surface of the outer member;*

*wherein the first end of the inner member and the first end of the outer member of each pipe joint are substantially simultaneously connectable to the second end of the inner member and the second end of the outer member of another one of the plurality of pipe joints; and*

*wherein the first end of the outer member of each pipe joint is connectable to the second end of the outer member of another one of the plurality of pipe joints so that the outer members of the plurality of pipe joints, when connected, form a passageway extending the length of the system of pipe joints.*

*56. The horizontal boring machine of claim 55 further comprising:*

*a frame; and*

*a rotary drive supported on the frame, the rotary drive being operatively connectable to the first end of the drill string for driving the rotation of the drill string.*

*57. The horizontal boring machine of claim 56 wherein the rotary drive comprises a biasing assembly to urge substantially simultaneous, non-threaded, torque-transmitting engagement of the inner member of a pipe joint loaded on the boring machine with the rotary drive and with the inner member at the first end of the drill string.*

*58. The horizontal boring machine of claim 55 further comprising a directional boring head attached to the second end of the drill string.*

*59. The horizontal boring machine of claim 55 wherein the first end and second end of the outer member are correspondingly threaded for connection to adjacent similarly formed outer members.*

*60. The horizontal boring machine of claim 55 wherein the first end and second end of the outer member are correspondingly a pin end and a box end.*

*61. The horizontal boring machine of claim 55 wherein the first end and second end of the inner member are correspondingly a pin end and a box end.*

*62. The horizontal boring machine of claim 55 wherein the first end of the inner member extends a distance beyond the first end of the outer member and a radially projecting annular stop member is disposed near the first end of the inner member beyond the first end of the outer member.*

*63. The horizontal boring machine of claim 55 wherein the outer surface of the outer member defines a circumferential groove near the first end of the outer member.*

*64. The horizontal boring machine of claim 55 wherein the inner member comprises a solid rod.*

*65. The horizontal boring machine of claim 55 wherein the outer surface of the outer member defines a means for positioning the pipe joint on the boring machine near the first end of the outer member.*

* * * * *